United States Patent
Tucker et al.

(10) Patent No.: US 7,572,324 B1
(45) Date of Patent: Aug. 11, 2009

(54) NON-CHROMATE PRIMER FOR PAINTING

(75) Inventors: Wayne C. Tucker, Exeter, RI (US);
Maria G. Medeiros, Bristol, RI (US);
Richard Brown, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/120,480

(22) Filed: May 14, 2008

(51) Int. Cl.
*C09D 5/00* (2006.01)
*C09D 5/08* (2006.01)
*C09D 5/12* (2006.01)

(52) U.S. Cl. .............. 106/14.44; 106/14.05; 106/14.41; 106/311; 106/482; 106/491; 252/364

(58) Field of Classification Search .............. 106/14.05, 106/14.41, 14.44, 311, 482, 491; 252/364
See application file for complete search history.

(56) References Cited

U.S. PATENT DOCUMENTS

| | | | | |
|---|---|---|---|---|
| 4,014,703 A * | 3/1977 | Hayati et al. | ............... | 106/1.17 |
| 5,266,611 A * | 11/1993 | Teschendorf | ................ | 523/416 |
| 5,708,039 A * | 1/1998 | Daly et al. | ..................... | 521/61 |
| 5,888,655 A * | 3/1999 | Harris et al. | ............. | 428/423.1 |
| 5,951,747 A * | 9/1999 | Lewis et al. | .............. | 106/14.44 |
| 6,059,867 A * | 5/2000 | Lewis et al. | .............. | 106/14.44 |
| 6,451,443 B1 * | 9/2002 | Daech | ....................... | 428/472 |
| 6,475,300 B2 * | 11/2002 | Shimakura et al. | .......... | 148/247 |
| 6,482,274 B2 * | 11/2002 | Shimakura et al. | .......... | 148/247 |
| 6,482,536 B1 * | 11/2002 | Tanaka et al. | ............... | 428/626 |
| 6,583,187 B1 * | 6/2003 | Daly et al. | ..................... | 521/56 |
| 6,638,369 B1 * | 10/2003 | Tucker et al. | ............... | 148/247 |
| 6,696,106 B1 * | 2/2004 | Schultz et al. | ............. | 427/496 |
| 6,706,207 B2 * | 3/2004 | Tucker et al. | .............. | 252/79.1 |
| 6,726,916 B1 * | 4/2004 | Ramin | ........................ | 424/401 |
| 7,001,533 B2 * | 2/2006 | Tucker et al. | .............. | 252/79.1 |
| 7,022,254 B2 * | 4/2006 | Tucker et al. | .............. | 252/79.1 |
| 7,101,808 B2 * | 9/2006 | Tucker et al. | ............... | 438/745 |
| 2006/0233958 A1 * | 10/2006 | Matsumura et al. | ......... | 427/402 |

* cited by examiner

*Primary Examiner*—Anthony J Green
(74) *Attorney, Agent, or Firm*—James M. Kasischke; Jean-Paul A. Nasser; Michael P. Stanley

(57) ABSTRACT

The present invention uses titanate compounds to replace chromates in metal primer paints used for corrosion protection on metal substrates.

1 Claim, No Drawings

NON-CHROMATE PRIMER FOR PAINTING

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to corrosion protection of stainless steel and aluminum alloys. In particular, the present invention is directed to a unique use of titanate compounds to replace chromates in metal primer paints used for corrosion protection on metal substrates.

(2) Description of the Prior Art

Currently, technology is being sought that for a non-chromate conversion coating of certain types of aluminum. Included in this work are potential candidates including: acidic aqueous solutions containing potassium permanganate and cerous chloride, silane based materials, sol-gel technologies, vapor deposition processes, thermal spray technologies including high velocity oxygen and flame spray technologies, and anodizing using sulfuric acid/boric acid processes. Other chromate free conversions being considered are those that form a thin layer of aluminum oxyhydroxide, which is then sealed using solutions of metallic salts and organic compounds. Work has also been conducted that focused on organo-functional silanes as a possible replacement candidate for protecting aluminum and stainless steel alloys. Methods have been studied on titanium substrates to replace conventional acid etch and zinc chromate preparations. Silanes were investigated due to their good coupling agent capabilities to form covalent bonds with the titanium oxides sites on one side and the structural adhesive coatings on the other side. This covalent bonding and the hydrophobic nature of the silanes restrict bond degradation.

SUMMARY OF THE INVENTION

It is a general purpose and object of the present invention to produce a primer for painting aluminum and steel alloys that does not have any chromates.

The above objects are accomplished with the present invention by using solvents in combination with titanates to replace zinc chromate

DETAILED DESCRIPTION OF THE INVENTION

The present invention will seek to replace chromates with titanates in primer for painting. The formulation for a non-chromate primer for painting is as follows: xylene 4% by wt, 2-propanol, 27% by wt, 2-butoxyethanol 10% by wt, methyl isobutyl ketone 9% by wt, ethanol 2% by wt, isopropyl acetate 3% by wt, dibutyl phthalate 1% by wt, talc 27.8% by wt, titanium dioxide 5% by wt, carbon black 0.2% by wt, titanium zinc oxide 6% by wt and toluene 5% by wt.

What is claimed is:

1. A primer for painting comprising:
xylene 4% by wt;
2-propanol 27% by wt;
2-butoxyethanol 10% by wt;
methyl isobutyl ketone 9% by wt;
ethanol 2% by wt;
isopropyl acetate 3% by wt;
dibutyl phthalate 1% by wt;
talc 27.8% by wt;
titanium dioxide 5% by wt;
carbon black 0.2% by wt;
titanium zinc oxide 6% by wt; and
toluene 5% by wt.

* * * * *